J. J. PETERS.
DIGGING MACHINE.
APPLICATION FILED APR. 26, 1916.
1,191,992.
Patented July 25, 1916.
4 SHEETS—SHEET 1.
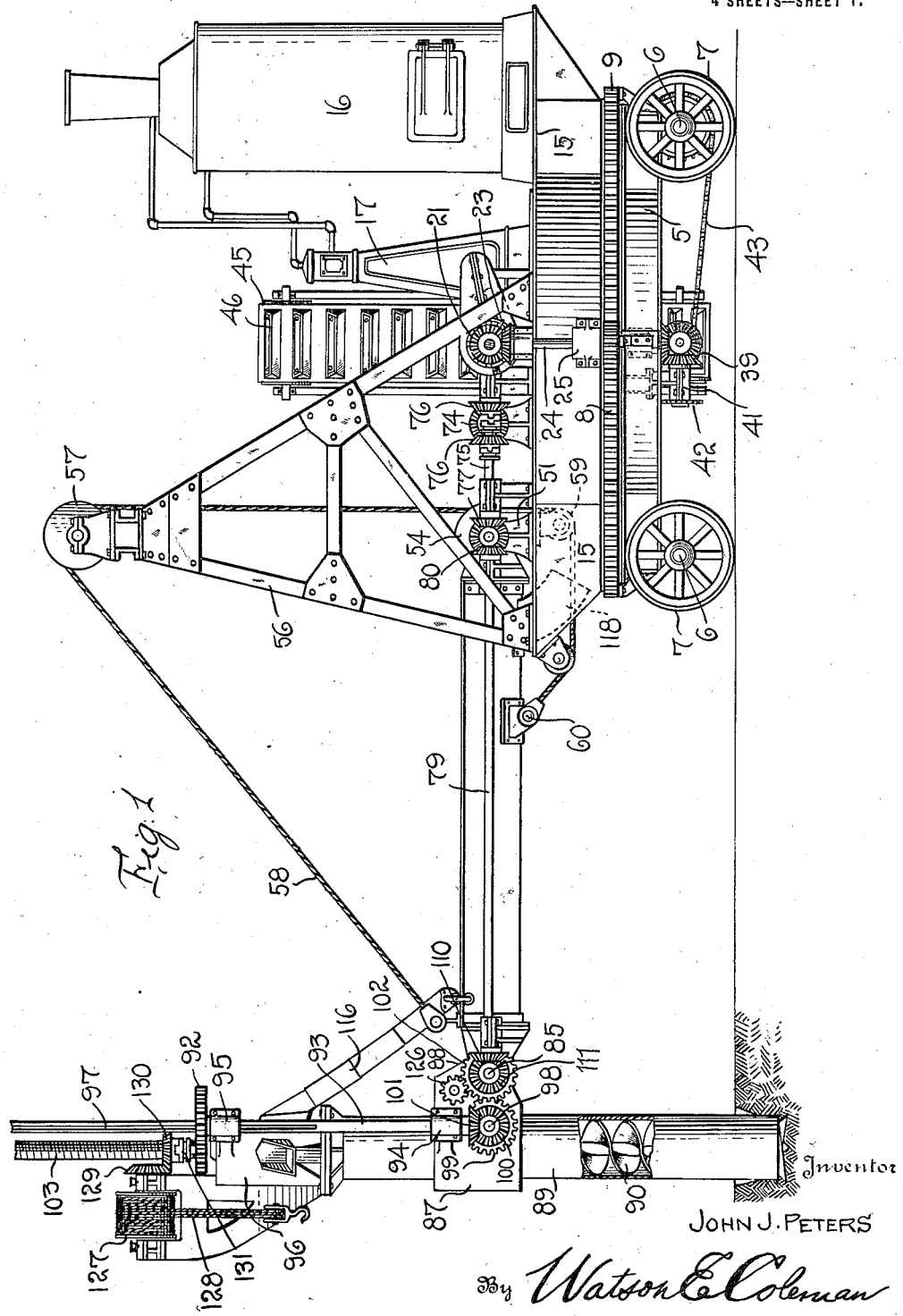
Inventor
JOHN J. PETERS
By Watson E. Coleman
Attorney

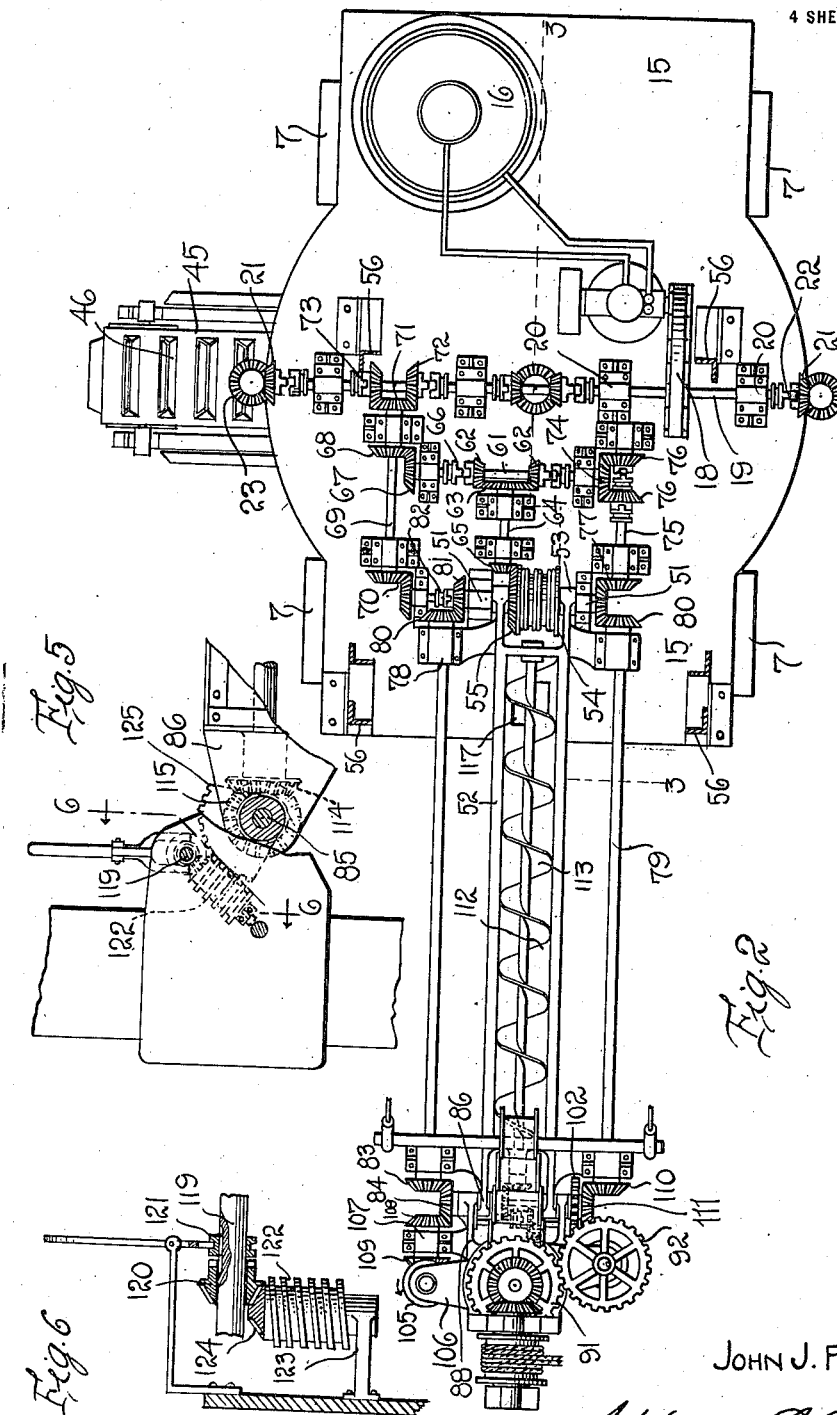

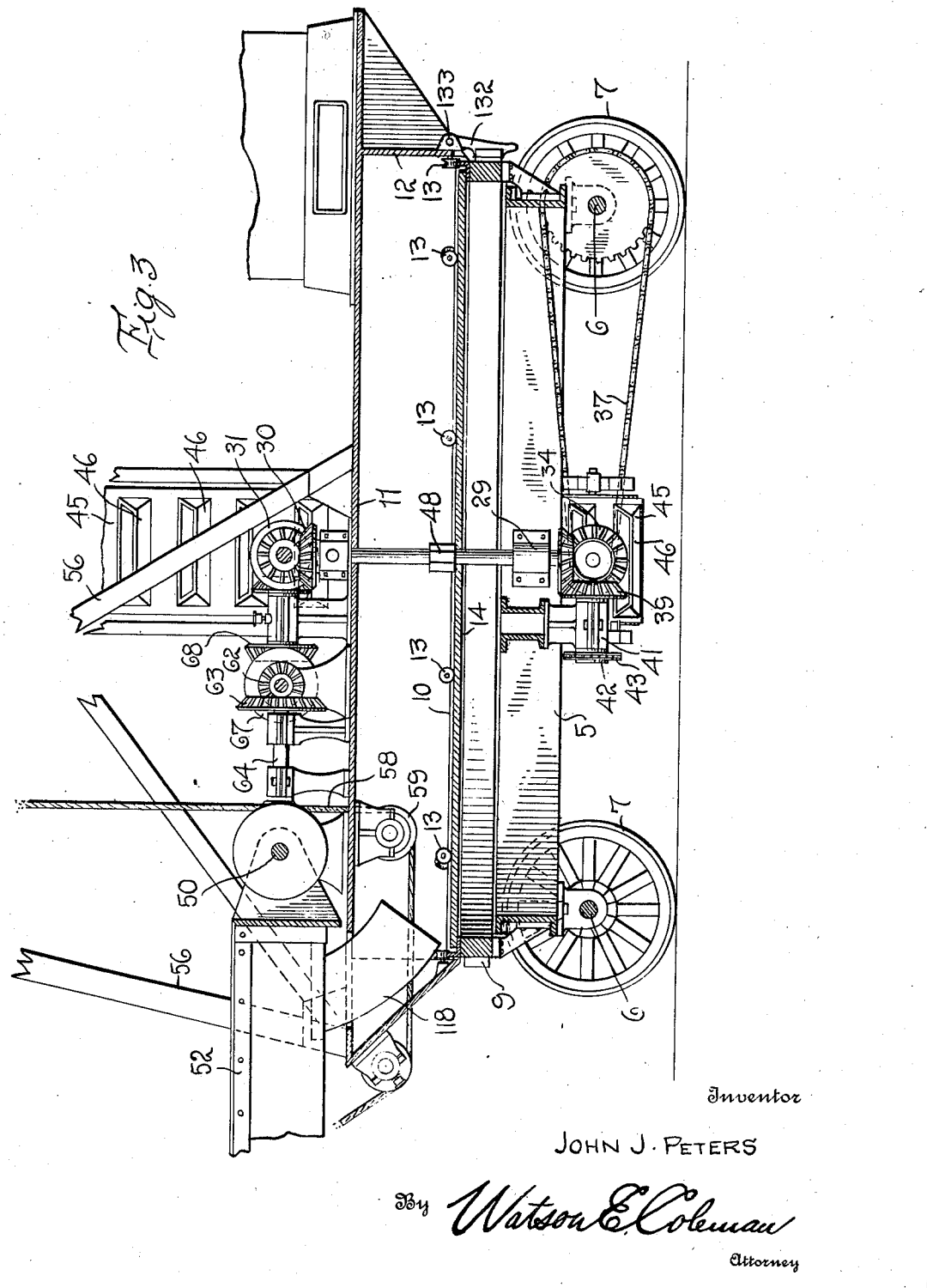

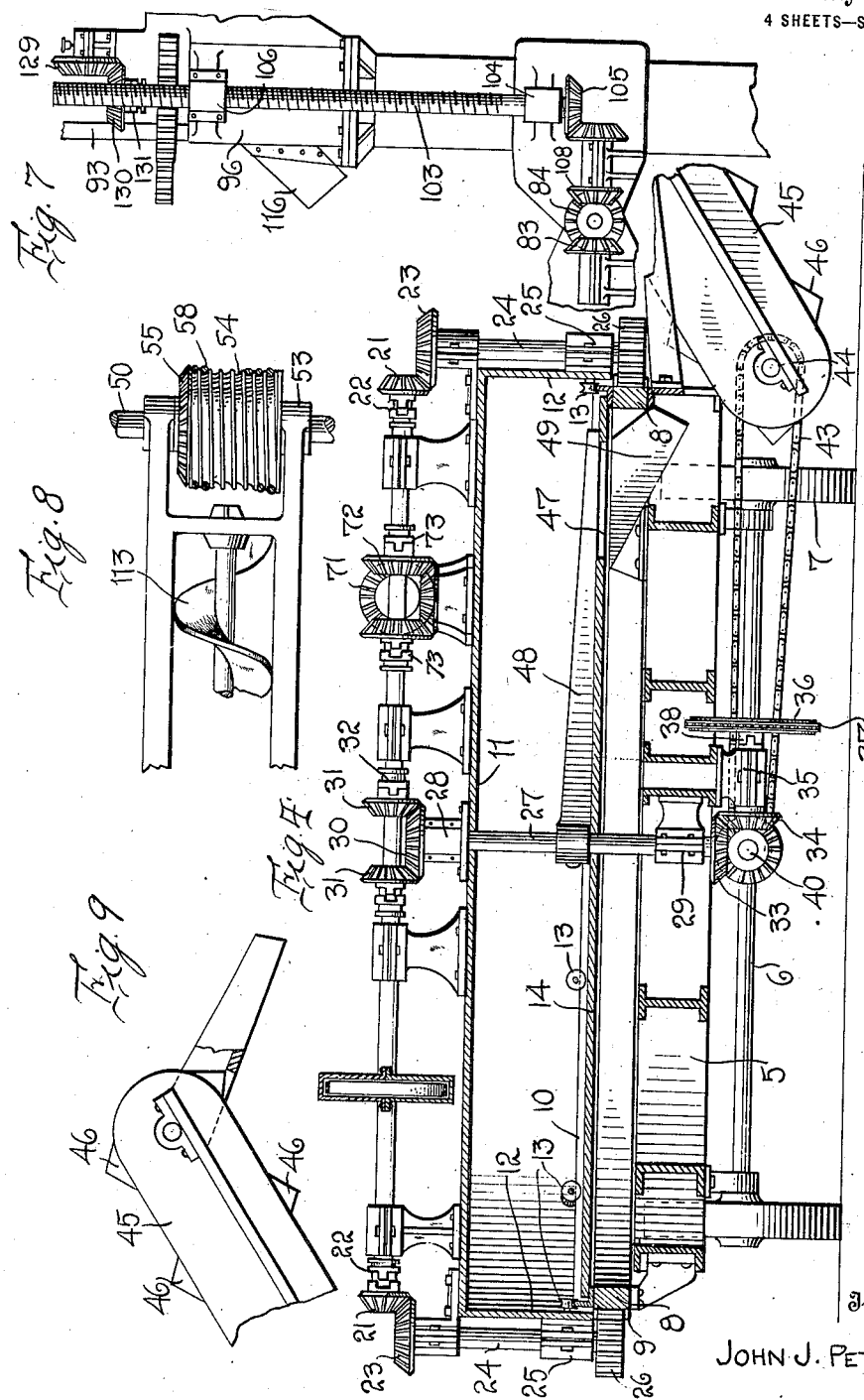

UNITED STATES PATENT OFFICE.

JOHN J. PETERS, OF FORDS, NEW JERSEY.

DIGGING-MACHINE.

1,191,992. Specification of Letters Patent. Patented July 25, 1916.

Application filed April 26, 1916. Serial No. 93,748.

*To all whom it may concern:*

Be it known that I, JOHN J. PETERS, a citizen of the United States, residing at Fords, in the county of Middlesex and State of New Jersey, have invented certain new and useful Improvements in Digging-Machines, of which the following is a specification, reference being had to the accompanying drawings.

This invention relates to an improved machine for digging well holes, posts or telegraph poles, or making similar excavations in the ground, and has for its primary object to provide relatively simple and positively operating mechanism for removing the earth as the digging of the hole progresses, and finally delivering the excavated earth to a suitable transporting vehicle.

It is another object of the invention to provide a machine for the above purpose including a vertically swinging boom, a tube mounted upon the outer end of said boom for angular movement with respect thereto, an auger operating within the tube, means for transmitting rotation to the auger, and additional means for moving the tube and auger vertically and lowering the same into the hole as the digging operation progresses.

It is another important object of the invention to provide improved means for mounting the tube and auger upon the outer end of the boom for angular movement with respect thereto, and mechanism for adjusting the same to the desired angular positions.

It is another object of the invention to provide a turn-table upon which the vertically swinging boom is mounted, said turn-table operating over a bed, means for receiving the excavated material from the upper end of the auger tube and discharging the same upon said bed, a discharge elevator, and means for delivering the material from the bed upon said elevator when the turn-table is rotated.

It is a further general object of the invention to provide an excavating or digging machine of the above character, wherein the digging of deep holes or excavations may be greatly expedited, while the machine as a whole is comparatively light in weight and may be readily moved from place to place.

With the above and other objects in view, my invention consists in the novel features of construction, combination and arrangement of parts to be hereinafter more fully described, claimed and illustrated in the accompanying drawings, in which, Figure 1 is a side elevation of a digging machine constructed in accordance with the preferred embodiment of the invention; Fig. 2 is a top plan view thereof; Fig. 3 is an enlarged vertical section taken on the line 3—3 of Fig. 2; Fig. 4 is a similar view looking at right angles to Fig. 3; Fig. 5 is an enlarged detail view, partly in section, showing the mechanism for angularly positioning the auger and tube through which the earth is fed; Fig. 6 is a detail section taken on the line 6—6 of Fig. 5; Fig. 7 is a detail elevation of the auger tube, looking at the opposite side thereof from that shown in Fig. 1 and illustrating the means for raising and lowering the same with respect to the boom; Fig. 8 is an enlarged detail plan view of the cable drum and one end of the spiral conveyer; and Fig. 9 is a side elevation of the upper end of the elevator, the discharge chute being shown partly in section.

Referring in detail to the drawings, 5 designates a suitable truck frame which is mounted upon spaced axles 6 on the ends of which the ground wheels 7 are revolubly supported. It being manifest that various constructions of the frame 5 might be utilized for supporting the operating parts of the machine, the same will not be described in detail. It will suffice to state that upon the frame 5, an annular rack 8 is mounted and suitably fixed or secured, the teeth 9 being formed upon the outer peripheral face of the annulus. Upon the upper side of this fixed annular gear or rack, a track 10 is secured, said track being of angular form in cross-section and having an upstanding flange, as clearly shown in Figs. 3 and 4 of the drawings.

11 designates a turn-table, upon which the operating mechanism is mounted and arranged. This turn table is in the form of a cylindrical drum open at its bottom, and upon the inner face of the vertical wall 12 of said drum a spaced series of rollers 13 are rotatably mounted to travel upon the vertical flange of the track 10. To the horizontal flange of said track, the outer edge of a circular bed plate 14 is fixed, the purpose of which will more fully hereinafter appear.

The top of the turn-table 11 is preferably of the form shown in Fig. 2 and is provided on opposite sides with the extensions 15. Upon one of these extending portions of the table, the boiler 16, which supplies steam to the engine indicated at 17, is mounted. This engine may be of any approved construction and the power shaft thereof is operatively connected by a drive chain 18 to a sprocket gear fixed upon a shaft 19 extending across the turn-table at its center and mounted in suitably spaced bearings 20. Upon each end of this shaft, a bevel gear 21 is loosely mounted and is adapted to be locked in operative connection to the shaft by a suitable clutch 22. Each of the gears 21 is in mesh with a bevel gear 23 fixed upon the upper end of a vertical shaft 24 mounted in bearings 25 secured to the turn table 11. Upon the lower end of each of the shafts 24 arranged at diametrically opposite points on the turn table, a cog gear 26 is fixed for meshing engagement with the teeth of the annular rack 8. It will be understood that when one of the bevel gears 21 is locked upon the shaft 19, the table will be rotated in one direction, and upon releasing said gear and locking the other of the gears 21 to the shaft, the table will be rotated in an opposite direction.

A vertically disposed shaft 27 extends centrally through the turn table and is mounted at its upper end in a suitable bearing 28 fixed to the top wall of the table and at its lower end in a bearing 29 secured to the truck frame 5. To the upper end of said shaft, the bevel gear 30 is fixed, and gears 31 loosely mounted upon the shaft 19 mesh with said gear 30 at diametrically opposite points. Either of these gears 31 may be locked upon the shaft for rotation therewith by means of a clutch 32. Upon the lower end of the shaft 27, a bevel gear 33 is fixed and meshes with the gear 34 on one end of a shaft journaled in a bearing 35 which is suitably supported upon the truck frame 5. On the other end of this shaft, a sprocket wheel 36 is loosely mounted and a drive chain 37 connects this sprocket wheel to a drive sprocket on one of the wheel axles 6. By means of the clutch indicated at 38, the sprocket 36 may be locked upon the shaft and the machine thus positively driven over the ground from place to place. The bevel gear 33 also meshes with a second bevel gear 39 on one end of a shaft 40 which is mounted in the bearing 41. A sprocket wheel 42 is fixed to the other end of said shaft and is connected by means of a chain 43 to a sprocket wheel on the end of the lower shaft 44 of an inclined elevator indicated at 45. This elevator extends transversely from one side of the machine and the frame thereof is suitably mounted and supported upon the truck frame 5. The elevator may be of any approved construction and includes an endless series of buckets 46.

The bed plate 14 is provided with an opening 47 therein adjacent to its periphery and a scraper arm 48 is fixed to the shaft 27 and extends radially therefrom, said arm engaging at its lower edge upon the surface of the bed plate and extending outwardly beyond the opening 47. A chute 49 is fixed in the frame 5 immediately beneath the opening 47 and is adapted to discharge the material directed through said opening into the elevator buckets 46.

Upon the top of the turn-table 11, a transverse shaft 50 is rotatably mounted in bearings indicated at 51. A boom 52 is provided upon its end with spaced arms 53 which are loosely mounted upon the shaft 50. A drum 54 is also loosely mounted upon said shaft between the arms 53 of the boom and is provided upon one of its ends with a bevel gear 55. A vertical frame structure 56 is mounted upon the turn-table, and in suitable bearings upon the upper end of this frame a pair of sheaves 57 are rotatably mounted. A cable 58 traverses each of these sheaves and has one of its ends connected to the outer end of the boom 52. These cables extend downwardly and around the drum 54 and then downwardly through openings in the top of the turn table 11 and over the spaced guide sheaves 59 and have their other ends connected, as at 60, to the boom 52 adjacent to its inner end.

A shaft 61 is mounted upon the turn table in parallel relation to the shaft 19 and bevel pinions 62 are loosely mounted upon said shaft to mesh with opposite sides of the bevel gear 63 on one end of a shaft 64. A pinion 65 on the other end of said shaft meshes with the gear 55 on the end of the drum. Either of the pinions 62 may be locked to the shaft 61 to transmit rotation to the shaft 64 in either direction by means of a clutch 66. A bevel gear 67 on one end of the shaft 61 meshes with a similar gear 68 on a shaft 69 which is geared to one end of the shaft 50, as indicated at 70. A bevel gear 71 is fixed upon the other end of this shaft whereby rotation may be transmitted thereto from the shaft 19 through the medium of the loosely mounted gears 72 on the latter shaft, each of which is provided with a suitable clutch 73. A bevel gear 74 is fixed upon the other end of the shaft 61 to transmit rotation to the shaft 75 through the medium of the spaced gears 76 thereon. This shaft 75 is geared to the opposite end of the shaft 50, as at 77.

The boom 52 is provided upon its inner and outer ends and on each side thereof with the bearing castings 78 in which the ends of the longitudinally extending shafts 79 are journaled. The inner end of each of these shafts is equipped with a bevel gear 80, one of which meshes with the gear on the shaft 50 which is engaged with the gear 77, and the other with the loosely mounted gear 81 on the shaft 50. This latter gear is provided with a clutch 82, whereby one of the shafts 79 may be thrown out of operation.

Upon the outer end of one shaft 79, a gear 83 is secured and meshes with a gear 84 on one end of a transverse shaft 85 which is rotatably mounted in the spaced bearings 86 on the end of the boom.

87 designates a guide yoke which is formed in spaced arms 88 having bearings upon one of their ends surrounding the shaft 85 and mounted to rock thereon. A metal tube 89 is axially movable through the guide yoke 87 and within this tube an earth auger and conveyer 90 is rotatably mounted. The auger shaft extends above the upper end of the tube 89 and, upon the same, a cog gear 91 is fixed for meshing engagement with a cog gear 92 upon the vertical shaft 93 which is supported in a bearing 94 on the yoke 87 and a bearing 95 upon the casing 96 which is suitably secured to the upper end of the tube 89. This shaft is provided with a keyway 97 to receive a key upon the gear 92 so that the latter may shift axially upon the shaft. Upon one side of the guide yoke 87, a stub shaft 98 is fixed, upon which a cog gear 99 is journaled, said cog gear being provided with a bevel gear 100 on its face for meshing engagement with a similar gear 101 on the lower end of the shaft 93. The gear 99 is in mesh with a cog gear 102 fixed upon the shaft 85.

For the purpose of raising and lowering the tube 89 and the earth auger 90 with respect to the yoke 87, I provide the screw 103 which is supported at its lower end in a bearing arm 104 on the yoke 87, and to this lower end of the screw a bevel gear 105 is fixed. The screw 103 has threaded engagement in an arm 106 on the casting 96. In a bearing 107 on the guide yoke 87, a shaft is mounted, upon each end of which a bevel gear 108 and 109 respectively, is fixed. The gear 108 meshes with one side of the gear 84 while the gear 109 is engaged with the gear 105 on the lower end of the screw 103. It will be apparent from this construction, that when the gear 81 is locked upon the shaft 50, rotation will be transmitted to the shaft 79, to the end of which the gear 83 is fixed, and the gear 84 will be rotated in one direction to transmit rotation to the screw 103 which, through its threaded connection with the arm 106, will lower the tube 89 and the auger 90 into the hole formed in the ground by the progressive boring or digging action of the screw. A gear 110 is also fixed on the outer end of the other shaft 79 and meshes with a similar gear 111 upon the end of the shaft 85. As rotation is simultaneously transmitted to the shaft 93 through the medium of the gears 99 and 102, it will be understood that the auger 90 is continuously rotated as the tube or casing 89 is lowered into the hole so that its progressive cutting action will continue.

The boom 52 is formed with a trough 112 in which a screw conveyer 113 is operatively mounted. Upon one end of the conveyer shaft, a bevel gear 114 is fixed and meshes with a similar gear 115 fixed upon the shaft 85. A chute 116, which consists of a plurality of telescopically engaged sections, is pivotally mounted at one of its ends upon the boom 52 over the trough 112, and at its other end is connected to the opposite side of an opening in the casting 96. Into this chute, the material is delivered by the auger 90. The sections of the chute 116 have free relative movement in the axial movement of the auger and the tube or casing 89 therefor. The excavated material is delivered into the trough 112 and carried inwardly by the screw conveyer 113. An opening 117 is provided in the base of the trough 112 at its inner end, and a curved spout 118 extends downwardly from this opening through the top of the turn-table, as shown in Fig. 3, and discharges the earth upon the stationary bed plate 13. After the hole has been dug, a reverse rotation is transmitted to the shaft 85 through the medium of the shafts 69 and 79 and the tube 89 and auger 90 are thus drawn upwardly from the hole. By means of the cables 58, the boom 52 may now be swung upwardly upon the turn-table to an inclined position. Either of the gears 21 is now clutched upon the shaft 19 and the said turn table is rotated, the shaft 27 and arm 48 also turning with the table or independently thereof. The arm 48 carries the excavated earth around over the bed plate 14 and directs the same through the opening 47 and chute 49 into the buckets 46 of the elevator. The elevator being actuated through the medium of the chain 43, carries the material upwardly and discharges the same into a suitable vehicle arranged below the upper end of the elevator. In this manner, it will be understood that the earth may be very quickly discharged from the machine without manually handling the same.

For the purpose of operating upon a hillside rather than even ground, I have devised means whereby the auger 90 and its tube or casing may be angularly positioned with respect to the end of the boom 52 upon which the same is mounted. To this end, a transverse shaft 119 is journaled in the bearing arms 88 of the guide yoke 87, and upon this shaft a bevel gear 120 is loosely mounted and is adapted to be locked to the shaft by a shiftable clutch member 121 keyed upon the shaft, as clearly shown in Fig. 6. A worm 122 is rotatably mounted in a bracket arm 123 fixed to one of the arms 88 of the yoke, and this worm is provided upon one end with a bevel gear 124 with which the gear 120 is in meshing engagement. A worm gear sector 125 is fixed to the hub extension on one of the arms 86 of the boom 52, and with this gear sector 125 the worm 122 is operatively engaged, said worm being suitably mounted and supported upon the yoke 87. Upon one end of the shaft 119, a pinion 126 is secured and has meshing engagement with the cog gear 102 on the shaft 85. Thus, it will be seen that rotation is constantly transmitted to the shaft 119 during the operation of the mechanism, and by locking the bevel gear 120 on said shaft the worm 122 will be rotated which, in turn, will transmit movement to the worm gear sector 125 and thus rock the bearing arms of the yoke 87 upon the shaft 85 and position the yoke and the movable tube or casing 89 therein at the desired angle. The operative connection between the gear 120 and the shaft 119 is then released and the worm 122 will remain interlocked with the teeth of the sector 125.

Upon the casting 96, a drum 127 is suitably mounted, upon which a cable 128 is adapted to be wound. A bevel gear 129 on one end of the drum shaft meshes with a similar gear 130 loosely mounted upon the upper end of the auger shaft 90. A clutch member 131, keyed to the shaft, is adapted to lock the gear 130 thereto and transmit rotation to the drum 127. By the provision of this drum and cable, telegraph poles and the like may be readily placed in position in the hole excavated by the auger 90. During the operation of the machine, the turn-table 11 is adapted to be locked against casual rotation by means of the pawl or dog 132 pivoted, as at 133, upon the outer face of the vertical wall 12 of the table. This dog is adapted for engagement between adjacent teeth 9 of the annular rack 8, as seen in Fig. 3, and when thus disposed, will securely hold the table in a stationary position upon the truck frame.

From the foregoing description, taken in connection with the accompanying drawings, the construction, manner of operation, and several advantages of my improved hole digging machine will be clearly understood.

By means of the apparatus, it is manifest that such operations are greatly expedited and the labor incident to the placing of the poles in position, reduced to a minimum. The discharge of the material removed from the hole is entirely automatic, and the mechanism being reliable and positive in its operation requires but little care or attention from the operator or attendant.

It is apparent from the above description, that the machine may also be advantageously employed for various other excavating operations in the digging of post holes, and I do not, therefore, desire to be limited to this specific use of the invention.

The form, construction, and mounting of the turn table and the location and arrangement of the elevator, and the construction and mounting of the several operating mechanisms, are all susceptible of considerable modification and it is, therefore, to be further understood that I reserve the privilege of adopting all such legitimate changes as may be fairly embodied within the spirit and scope of the invention as claimed.

The machine is also particularly adapted for digging clay for use in the fabrication of ordinary red brick, fire brick, hollow tile, pottery, and the like.

Having thus fully described my invention, what I desire to claim and secure by Letters Patent is:—

1. In an excavating machine, a turn-table, a boom mounted upon the table, excavating mechanism carried by the boom, a conveyer mounted upon the boom, a bed plate upon which the excavated material is discharged by the conveyer, an elevator, means for rotating the turn table, and means for discharging the material from the bed plate upon the elevator in the rotation of the table.

2. In an excavating machine, a turn-table, a boom mounted upon the table, excavating mechanism carried by the boom, a conveyer mounted upon the boom, a bed plate upon which the excavated material is discharged by the conveyer, an elevator, means for rotating the turn-table, and a scraper movable over the surface of the bed plate in the rotation of the table to discharge the material from the bed plate upon the elevator.

3. In an excavating machine, a turn-table, a boom mounted upon the turn table, excavating mechanism mounted upon the outer end of the boom, a conveyer mounted upon the boom to receive the excavated material, a relatively stationary bed plate, a discharge spout connected to the inner end of the boom to receive the material from the conveyer and deliver the same upon the bed plate, said bed plate having an opening therein, an elevator, a rotatable shaft extending centrally through the bed plate and the turn table, a scraper arm fixed upon said shaft, and mechanism for simultaneously rotating the turn table and said shaft whereby the arm will direct the excavated material through the opening in the bed plate and upon the conveyer.

4. In an excavating machine, a stationary annular rack, a turn-table rotatably mounted upon said rack, a boom pivotally mounted upon the turn-table, excavating mechanism on the outer end of said boom, a bed plate fixed upon the rack, means carried by the boom to receive and discharge the excavated material upon said bed plate, means on the turn-table coöperating with the rack to lock the table against rotation in the operation of the machine, an elevator, mechanism for rotating the turn-table including a vertically disposed shaft having a gear fixed thereon meshing with the stationary rack, and means movable over the surface of the bed plate in the rotation of the table to discharge the material from said plate upon the elevator.

5. In a post hole digging machine, the combination with a turn table and a boom mounted thereon for vertical swinging movement, of a tubular casing mounted upon the outer end of said boom for axial movement, an auger rotatably mounted in said casing, and mechanism for lowering the casing into the hole as the digging progresses and simultaneously rotating the auger.

6. In a post hole digging machine, the combination with a turn-table and a boom mounted thereon for vertical swinging movement, of a tubular casing mounted upon the outer end of said boom for axial movement, an auger rotatably mounted in said casing, mechanism for lowering the casing into the hole as the digging progresses and simultaneously rotating the auger, a conveyer mounted in the boom, and a flexible discharge chute pivotally mounted at one of its ends upon the boom and connected at its other end to the upper end of the auger tube to receive and deliver the excavated material to said conveyer.

7. In a post hole digging machine, the combination with a turn-table and a boom mounted thereon for vertical swinging movement, of a tubular casing mounted upon the outer end of said boom for axial movement, an auger rotatably mounted in said casing, mechanism for lowering the casing into the hole as the digging progresses and simultaneously rotating the auger, and means for angularly positioning the auger and casing with respect to the end of the boom.

8. In a post hole digging machine, the combination with a turn-table and a vertically swinging boom mounted thereon, of a yoke mounted in the outer end of the boom, a tubular casing axially movable through said yoke, an auger rotatably mounted within the casing, a screw rotatably mounted upon the yoke and having a threaded operative connection with the casing, and mechanism to rotate said auger and simultaneously impart rotation to said screw to shift the tubular casing and the auger axially through the yoke.

9. In a post hole digging machine, the combination with a turn-table and a vertically swinging boom mounted thereon, of a yoke pivotally mounted in the outer end of the boom, a tubular casing axially movable through said yoke, an auger rotatably mounted within the casing, a screw rotatably mounted upon the yoke and having a threaded operative connection with the casing, mechanism to rotate said auger and simultaneously impart rotation to said screw to shift the tubular casing and the auger axially through the yoke, and additional means for imparting a pivotal rocking movement to the yoke to dispose the auger and its casing at an angle with respect to the boom.

10. In a post hole digging machine, the combination with a turn-table and a boom pivotally mounted thereon for vertical swinging movement, of an auger and a tubular casing therefor mounted for unitary axial movement upon the outer end of the boom and also for angular movement with respect thereto, a conveyer mounted in the boom, an articulated discharge chute connected to the upper end of the auger casing to receive the excavated material and discharge the same upon the conveyer in the boom, mechanism for rotating the auger and simultaneously shifting the same and its casing axially, additional means to dispose the auger and its casing at an angular position with respect to the boom, means for elevating the boom upon the turn-table, means for rotating said turn-table, a discharge elevator, and means operating in the rotation of the turn-table to deliver the excavated material to the elevator.

11. In an excavating machine, a bed plate, an elevator mounted at the outer edge of the bed plate, means discharging the excavated material upon the bed plate, and means operating over the surface of the bed plate to direct the material upon the elevator.

12. In an excavating machine, excavating mechanism, a bed plate, means discharging the excavated material upon said bed plate, an elevator, said bed plate being provided with an opening therein, a chute beneath said opening, and a rotatably mounted arm operating over the surface of the bed plate to direct the excavated material into said chute and upon the elevator.

13. In an excavating machine, a turn table, excavating mechanism mounted thereon, a bed plate, means discharging the excavated material upon said bed plate, an elevator, means for rotating the turn table, and means operating over the surface of the bed plate to discharge the material therefrom upon the elevator.

14. In an excavating machine, a turn table, a boom mounted upon the turn table, excavating mechanism carried by the boom, a bed plate upon which the excavated material is discharged, means for rotating the turn table, and rotatably mounted means operating over the surface of the bed plate to discharge the material therefrom.

15. In an excavating machine, a turn table, a boom mounted upon the turn table, excavating mechanism carried by the boom, a bed plate upon which the excavated material is discharged, means for rotating the turn table, means for locking the turn table against rotation during the operation of the actuating mechanism, an elevator, and means operating over the surface of the bed plate to discharge the material therefrom upon the elevator.

16. In a post hole digging machine, the combination with a support, of an axially movable casing mounted upon the support, an auger rotatably mounted in said casing, mechanism for lowering the casing into the hole as the digging progresses and simultaneously rotating the auger, and means for angularly positioning said casing and the auger with respect to the support.

In testimony whereof I hereunto affix my signature in the presence of two witnesses.

JOHN J. PETERS.

Witnesses:
WILLIAM A. SPENCER,
EDWARD A. PFEIFFER.